United States Patent
Haschke

(10) Patent No.: US 6,596,962 B2
(45) Date of Patent: Jul. 22, 2003

(54) PROCESS AND DEVICE FOR JOINING OF WORKPIECE PARTS BY MEANS OF AN ENERGY BEAM, IN PARTICULAR BY MEANS OF A LASER BEAM

(75) Inventor: Igor Haschke, Berlin (DE)

(73) Assignee: Michael Anders (DE)

( * ) Notice: Subject to any disclaimer, the term of this patent is extended or adjusted under 35 U.S.C. 154(b) by 12 days.

(21) Appl. No.: 09/783,363

(22) Filed: Feb. 14, 2001

(65) Prior Publication Data
US 2001/0013509 A1 Aug. 16, 2001

(30) Foreign Application Priority Data
Feb. 16, 2000 (DE) .......................... 100 06 852

(51) Int. Cl.$^7$ .............................................. B23K 26/00
(52) U.S. Cl. ............................ 219/121.64; 219/121.61; 219/121.63
(58) Field of Search ................. 219/121.64, 121.61, 219/121.63

(56) References Cited

U.S. PATENT DOCUMENTS

| 5,137,223 A | * | 8/1992 | Brandon et al. | .......... 242/54 R |
| 5,446,257 A | | 8/1995 | Sakamoto et al. | ..... 219/121.63 |
| 2002/0117485 A1 | * | 8/2002 | Jones et al. | ............ 219/121.64 |

FOREIGN PATENT DOCUMENTS

| DE | 44 12 093 A1 | 10/1995 | ........... B23K/26/02 |
| DE | 44 15 035 C2 | 11/1996 | ........... B23K/26/00 |
| DE | 196 15 069 A1 | 10/1997 | .............. B25J/9/00 |
| JP | 581760778 | 10/1983 | |
| JP | 03027886 | 2/1991 | |
| JP | 04361887 | 12/1992 | |
| JP | 06106372 | 4/1994 | |
| JP | 07178555 | 7/1995 | |
| JP | 11300485 | 11/1999 | |

* cited by examiner

Primary Examiner—M. Alexandra Elve
(74) Attorney, Agent, or Firm—Herbert H. Finn

(57) ABSTRACT

The invention relates to a process and device for joining workpiece elements by means of an energy beam, especially a laser beam. The device comprises a wire feeding device for feeding a filler wire. In order to create optimum guidance of the wire relative to the laser beam and to the workpiece surface, the wire feeding device is mounted in a movable manner in the direction of the axis of the energy beam, in such a way that the wire tip melting in the energy beam is guided in a non-positive manner along the workpiece surface.

12 Claims, 1 Drawing Sheet

PROCESS AND DEVICE FOR JOINING OF WORKPIECE PARTS BY MEANS OF AN ENERGY BEAM, IN PARTICULAR BY MEANS OF A LASER BEAM

BACKGROUND OF THE INVENTION

1. Field of the Invention

The invention relates to a process and a device for joining of workpiece elements by means of an energy beam, in particular a laser beam, making use of a filler material which is added in the form of a wire by means of a wire feeding device, whereby the wire is also used as a scanning element.

2. Description of the Related Art

The connecting of workpiece elements by laser beam welding or laser beam soldering making use of a filler wire is becoming of increasing importance in particular in the automobile manufacturing sector. One important aspect of this joining technique is the precise adjustment of the position of the filler wire relative to the laser beam. The adjustment is relatively difficult, however, because it must be very precise, the working laser beam is small and not visible to the human eye, and the structure of known laser beam devices renders observation of the joining process difficult. The position of the laser beam and the filler wire relative to the joint of the workpiece elements which are to be connected to one another must however be precisely maintained during the advance movement of the guidance machine used for this purpose. While the distance between the laser focusing device and the joint with the beam geometries conventionally used allows for relative large deviations to be tolerated, the lateral position of the laser beam to the joint and the distance between the filler wire and the joint, and its lateral position in relation to it during joining must be precisely maintained during the joining process.

Devices are known which have a regulated filler wire advance with fixed established wire feed positions.

In addition, devices are known which with the aid of sensors determine the position of the joint of the workpiece elements which are to be connected to one another, and the laser focusing device is guided in this position by actuators, together with the filler wire feeding device which is firmly connected to it during the joining process. Such a device is described, for example, in DE 44 15 035 C2. The position of the joint in this case can be determined only spatially in advance in relation to the joining process, since the joint is no longer identifiable at the immediate welding or soldering point. Such devices accordingly operate relatively imprecisely, despite their elaborate and expensive structure.

In addition to this, devices are known in which the entire joint contour is travelled over in a cycle carried out before the joining, and, with the aid of sensors, the actual current position of the joint contour is determined, in order for it to be travelled over in a second work sequence and for the workpiece elements to be joined during this sequence. The disadvantage here, however, is the additional time required for the preceding travel over the joint contour, and the fact that a thermal distortion during the jointing process must remain unconsidered.

From DE 44 12 093 A1, a device is known for controlling a laser welding machine, which comprises a reversible feed motor for the focusing head and a feed device secured to it for a filler material, with a guidance size voltage being imposed between the filler material and its feed device on the one hand and the workpiece on the other, the pick-up of which is connected to two parallel comparators, one of which is connected to a reference value voltage for a maximum value of a control range, and the other with a reference value voltage for a minimum value of the range. Both comparators take effect in this situation on a power controller, which in turn determines the desired direction of rotation and the operation of the feed motor. The filler material can be provided in any desired form, in particular in the form of a wire made of electrically conductive material. With this device the wire is therefore also used as an electrical scanning element.

Finally, devices are known which, by means of mechanical scanners and flexible securing, adjust the distance from the workpiece of a point in front of, behind, or next to the laser beam (related to the course of the welding or soldering seam; see for example DE 196 15 069 A1). Such scanners are however subject to mechanical wear. In addition, the angle position of the device in relation to the surface of the workpiece has a substantial influence on the precision of the joining process, since the mechanical scanner is supported on a point in front of, behind, or next to the immediate joint position.

SUMMARY OF THE INVENTION

The object of the present invention is to provide a process and device of the type referred to in the preamble, which will provide optimum guidance of the wire, especially in the direction of the axis of the energy beam.

The object is resolved in respect of the process according to the invention in that the filler wire is used as a mechanical scanning element, whereby the wire tip melting in the energy beam is guided in non-positive fit along the surface of the workpiece.

The invention is accordingly based on the idea of using the filler wire as a mechanical scanning element. By contrast with the conventional mechanical scanners, the filler wire is practically free of any wear, since it is continually melted in the energy beam. The filler wire scans the contour of the joint defined by the workpiece elements which are to be joined, by means of the tip of the wire in the edge of the immediate weld or solder position. The energy beam is for preference a laser beam. It is also conceivable, however, that the invention can also be used with electron beam joining.

If the wire guiding device is arranged in a displaceable manner in the direction of the axis of the energy beam and the wire top melted in the energy beam is guided in non-positive fit along the surface of the workpiece, an interval between the melting wire tip and the workpiece surface will automatically be established, which will ensure the optimum melting of the wire at the edge of the energy beam, in contact with the workpiece surface. In a lateral direction in relation to the welding or soldering seam which is to be created, the adjustment of the wire to the energy beam can be effected preferably by means of a visible auxiliary laser beam (a pilot laser).

The guidance of the energy beam in the direction of the interval, i.e. the guidance of the energy beam focus in the direction of the axis of the beam, can, according to a preferred embodiment of the process according to the invention, be effected in such a way that the device for focusing the energy beam is guided with a fixed distance from the workpiece surface. As an alternative the device for focusing the energy beam can also automatically be moved together with the wire feeding device. The latter arrangement is similar to known mechanical scanners, but with the difference that the reference point lies on the edge of the molten bath, i.e. on the edge of the welding or soldering position at that particular moment.

A further advantageous embodiment of the process according to the invention is provided in that, with the workpiece elements which are to be joined, which form a connecting joint with at least one lateral guide surface, the wire tip which is to be melted is guided in non-positive fit along the lateral guide surface. Such lateral guidance is possible, for example, in the creation of a flange weld or fillet weld. The laser beam and the wire guiding device can in this situation, being coupled to one another, be guided relative to the lateral guide surface by means of lateral displacement and/or a rotational movement.

It is further to advantage if the distance between the device for focusing the energy beam and the workpiece surface is determined and the joining process terminated in the event of a predetermined distance being exceeded or undercut. Thus, for example, the end of a welding seat can be identified at the end of a piece of sheet metal by a substantial change in the distance, and the joining process being ended accordingly.

According to a further advantageous embodiment of the process, provision is made for the contact pressure force of the wire tip being compared with a reference contact pressure force and the joining process being terminated if a predetermined reference contact pressure is exceeded or undercut. On the basis of the comparison of the actual contact pressure force of the wire tip with a reference contact pressure force, a conclusion can be drawn about erroneous guidance, excessive workpiece tolerances, poor joint preparation, deficient energy beam performance, and/or deficient advance movement of the guiding machine concerned. This enables the occurrence of qualitatively deficient welding or soldering connections to be identified in good time and for the appropriate correction to be carried out and an overload to the system avoided.

With regard to the device, the objective according to the invention is resolved in that the wire guiding device is mounted on bearings in the direction of the axis of the energy beam in such a way that the wire tip melting in the energy beam is guided in non-positive fit along the workpiece surface. The non-positive guidance of the wire tip can in this situation be effected simply by the force of gravity, a spring, pneumatic or hydraulic drives with specific pressure, electric motors with specific torque, or by means of sensors, in particular moment of force sensors, and actuators guided and regulated in accordance with these sensors. The regulation of the force by actuators with sensors which measure the contact pressure force of the wire as a scanning element allows for the exclusion of the influence of the inherent weight of the wire guiding device in the event of a change of its spatial orientation.

Other objects and advantageous embodiments of the process of the present invention and of the corresponding device will become apparent from a reading of the following detailed description and the appended claims.

BRIEF DESCRIPTION OF THE DRAWINGS

The invention is described hereinafter on the basis of schematic drawings representing several embodiment examples. In the drawings

DESCRIPTION OF THE PREFERRED EMBODIMENTS

Figure 1:
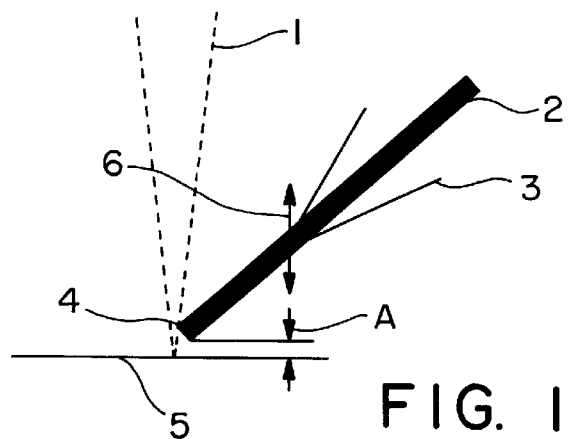
FIG. 1 is a side view of a device according to the invention, in the area of a filler wire being melted in a focused laser beam.

FIG. 1 shows a schematic representation of a device for joining workpiece elements by means of a laser beam. The device comprises an element, not shown in greater detail, for the focusing of the laser beam and a wire feeding device, shown only in part, for the feeding of a filler wire 2. The focusing of the laser beam 1 can be effected, for example, by means of a focusing lens. The wire feeding device comprises a guide nozzle 3. In addition to this, the device also comprises an element, not represented, for the delivery of inert gas (e.g. argon, helium, or nitrogen).

The wire feeding device is arranged so as to be capable of displacement, at least in the area of the guide nozzle 3, in the direction of the laser beam axis, and specifically in such a way that the wire tip 4 being melted at the focused laser beat 1 is guided in non-positive fit along the workpiece surface 5. The direction of movement of the wire feeding device is indicated by the double arrow 6. The non-positive guidance of the wire tip 4 can be effected, in the simplest case, by the force of gravity. In this situation, a distance A can be set automatically between the melting wire tip 4 and the workpiece surface 5, the value of which, however, tends towards zero during the joining process. In FIG. 1 the distance A is represented as a value greater than zero, for reasons of simplicity. Due to the movable mounting of the wire feeding device during the joining process, optimum melting of the wire 2 at the edge of the laser beam is assured, whereby the wire 2 comes in contact with the workpiece surface 5 above the molten bath. The wire 2 accordingly scans, at the edge of the molten bath, the contour of the joint defining the workpieces which are to be connected. The lateral adjustment of the wire to the laser beam can in this situation be effected with a visible auxiliary laser beam (pilot laser).

The non-positive guidance of the wire tip 4 can, as an alternative to the simple use of the force of gravity, also be effected by means of a spring or a pneumatic or hydraulic drive, which exercises a certain specific pressure on the wire 2. An electric motor can also be used to advantage for this purpose, which generates a specific torque. In addition, the non-positive guidance of the wire tip 4 can also be effected by means of the force moment sensors and the actuators guided in a regulated manner by them.

The guidance of the laser beam focus in the normal direction, related to the surface of the workpiece 5, is effected in such a way that the focusing device is guided at a fixed programmed distance from the workpiece surface 5. It is however also possible for the focusing device to be moved together with the wire feeding device.

Figure 2:
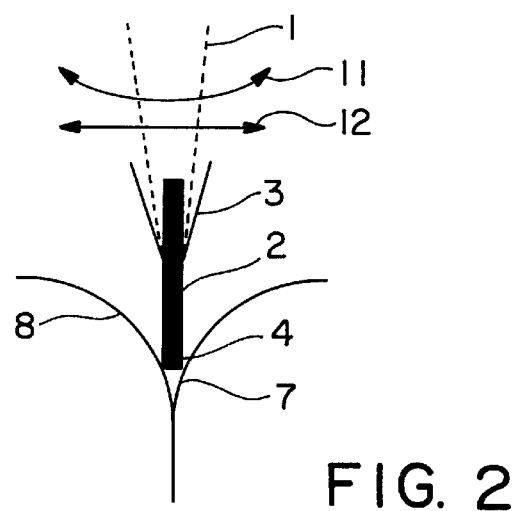
FIG. 2 is a view in the direction of advance of a device according to the invention, during the production of a flange weld.
Figure 3:
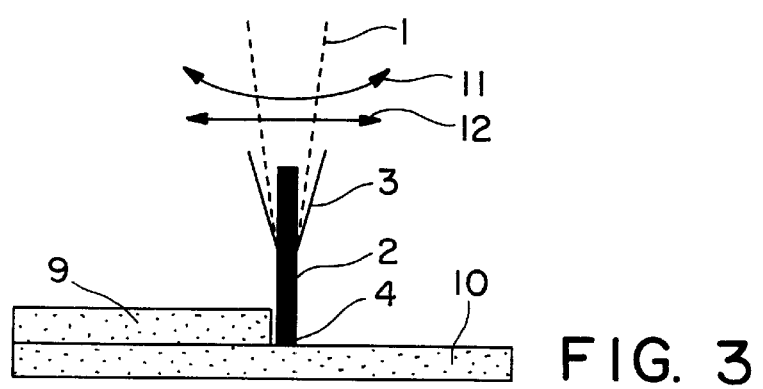
FIG. 3 is a view in the direction of advance of a device according to the invention, during the production of a fillet weld.

In FIGS. 2 and 3 the joining of workpiece elements 7, 8; 9, 10 in the advance direction of a laser beam welding or soldering device according to the invention is shown in schematic form, whereby FIG. 2 shows the creation of a flange weld and FIG. 3 the creation of a fillet weld. It can be seen that in these two cases in particular the joint shape defined by the workpiece elements 7, 8; 9, 10 which are to be joined to one another also allows for a non-positive guidance in a lateral direction of the wire tip 4 being melted at the edge of the laser beam. Under this precondition, the laser beam 1 and the filler wire 2 can also be guided in synchrony and firmly coupled to one another. This can be effected in the form of a linear displacement and/or a rotational movement, as shown in FIGS. 2 and 3 by corresponding double arrows 11, 12. In FIG. 3, to illustrate the lateral positional adaptation, the wire tip 4 is shown at a distance from the workpiece element 9. In fact, however, even this distance would not pertain during the joining process, because the wire 2 is guided in non-positive fit at the lateral guide surface formed by the workpiece element 9.

The rotational movement of the laser beam to the lateral positional adaptation can be effected by means of a deflection mirror, which is capable of pivoting about the axis of the laser beam shining on it. Such an optical arrangement allows for the performance of very substantial angle changes during the joining process. This is particularly advantageous with the use of robots as guidance machines for the advance movement, since unfavourable robot movements can be avoided by the appropriate adjustment of the optics.

The device according to the invention can, in addition to this, also be equipped with analog or digital sensors for the detection of the positions of its moving elements, as well as with sensors for detecting the contact pressure force of the filler wire 2. With the aid of these sensors, it is possible for a monitored search movement, with position or speed regulation, to be started from a position defined with reference to the workpiece surface and the course of the joint, and to be terminated when predetermined reference contact pressure values are reached. The advance movement of the guidance machine and the joining process can then be started.

The seam end at a plate end can, for example, be identified by a substantial change in the distance, and the joining process terminated accordingly.

If the positions or forces increase beyond specified limits during machining, this can lead to the conclusion of deficient guidance, excessive workpiece tolerances, poor joint preparation, deficient laser output performance, and/or a deficient advance movement of the guidance machine concerned. In this way, the occurrence of rejects can be identified in good time, and overloading of the system can be avoided.

To adjust the device, the position of the wire tip 4 at a particular moment can be read out with the aid of simple mechanical display devices, and, by the correction of the program of the guidance machine concerned, it can be brought into a preferred position in relation to the fixed part of the device. To do this, the wire 2 is first cut off in a defined manner with the working laser beam 1, whereby a spherical wire end is created, which lies precisely at the edge of the laser beam. Due to the spherical shape of the wire end, scratching of the workpiece surface during subsequent machining is very largely avoided. After that, the reference advance path of the guidance machine with the filler wire 2 can be determined by their fitting into the cross-section of the joint, and programmed by the input of a number of position details. The programming of the advance path is rendered substantially easier by the position data determined with the wire tip.

The invention is not restricted to the embodiments described above. Rather, a number of variants can be conceived, which, even with basically deviating designs, make use of the invention defined in the claims. It is conceivable in particular, for example, that, instead of a laser beam, an electron beam can be used it appropriate.

What is claimed is:

1. A process for joining workpiece elements by means of an energy beam, especially a laser beam, with the use of a filler wire, which is added by means of a wire feeding device, wherein the wire is used as a mechanical scanning element for scanning the contour of a joint defined by the workpiece elements, whereby said joint has at least one lateral guide surface, and wherein the wire tip being melted in the energy beam is guided in non-positive manner along the workpiece surface as well as along said lateral guide surface.

2. The process of claim 1, wherein the contact pressure force of the wire tip is measured by at least one sensor, and the position of the wire feeding device relative to the surface of the workpiece is automatically controlled as a function of the contact pressure force measured.

3. The process of claim 1, wherein the non-positive guidance of the wire tip along the workpiece surface is effected by at least one of the force of gravity, a spring, a pneumatic or hydraulic drive having a specific pressure, an electric motor having a specific torque and sensors and actuators guided by the sensors in a regulated manner.

4. The process of claim 1, wherein the wire is automatically guided by means of a wire feeding device which moves relative to the energy beam.

5. The process of claim 1, wherein the energy beam is focused by a device which is guided with, a fixed distance from the workpiece surface.

6. The process of claim 1, wherein the energy beam is focused by a device which is automatically moved together with the wire feeding device.

7. The process of claim 1, wherein the wire is adjusted in the lateral direction in relation to at least one of a weld and a solder seam which is to be created, by means of a visible pilot laser beam.

8. The process of claim 7, wherein the energy beam and the wire feeding device are guided coupled to one another by at least one of a linear displacement and a rotational movement relative to the lateral guide surface.

9. The process of claim 1, wherein the energy beam is focused by a device for focusing the energy beam and the distance between said device for focusing the energy beam and the workpiece surface is detected, and that the joining process is terminated in the event of a predeterminable distance being exceeded or undercut.

10. The process of claim 1, wherein the contact pressure force of the wire tip is compared with a reference contact pressure force, and the joining process is terminated in the event of a predeterminable reference contact pressure force being exceeded or undercut.

11. The process of claim 1, whereby a program-controlled guidance machine is used to guide the energy beam and the wire relative to the workpiece, and wherein, before joining is carried out, the wire tip is positioned in non-positive fit at several positions of the connection joint defined by the workpiece elements, the particular position data in each case of the wire tip is acquired, and, on the basis of the position data, the guidance machine is programmed in an advantageous position relative to the workpiece elements.

12. The process of claim 1, wherein the contact pressure force of the wire tip is measured by at least one sensor and compared with at least one predeterminable value, and the wire tip is used for the search for a connection joint defined by the workpiece elements, whereby a controlled search movement is begun from a defined position by means of analog or digital position sensors, and is terminated on reaching a predeterminable reference force.

* * * * *